United States Patent [19]

Takasugi

[11] Patent Number: 5,117,777
[45] Date of Patent: Jun. 2, 1992

[54] METHOD AND APPARATUS FOR TRANSPORTING AND PRESERVING LIVING FISHES

[75] Inventor: Mitsuo Takasugi, Kanagawa, Japan
[73] Assignee: Colpo Co., Ltd., Tokyo, Japan
[21] Appl. No.: 277,664
[22] Filed: Nov. 29, 1988

[30] Foreign Application Priority Data

Mar. 24, 1988 [JP] Japan .......................... 63-38667[U]
Sep. 7, 1988 [JP] Japan ................................. 63-224327

[51] Int. Cl.⁵ ............................................. A01K 63/02
[52] U.S. Cl. ............................................ 119/3; 119/15
[58] Field of Search ......................... 119/2, 3, 4, 15; 220/20.5, 22; 206/205, 315.11

[56] References Cited

U.S. PATENT DOCUMENTS

| | | | |
|---|---|---|---|
| 884,140 | 4/1908 | Erlwein | 119/3 |
| 1,639,555 | 8/1927 | Clark | 119/2 |
| 2,302,336 | 11/1942 | MacDonald | 119/3 |
| 2,680,424 | 6/1954 | Brown | 119/3 |
| 3,194,211 | 7/1965 | Stanek | 119/3 |
| 3,916,833 | 11/1975 | Serfling | 119/2 |
| 4,007,709 | 2/1977 | Wishner | 119/2 |
| 4,089,298 | 5/1978 | Wilson | 119/2 |
| 4,559,902 | 12/1915 | Mason et al. | 119/2 |
| 4,844,012 | 7/1989 | Jerrett | 119/2 |

FOREIGN PATENT DOCUMENTS

| | | | |
|---|---|---|---|
| 2572252 | 5/1986 | France | 119/3 |
| 738567 | 6/1980 | U.S.S.R. | 119/3 |

Primary Examiner—John G. Weiss
Attorney, Agent, or Firm—Browdy and Neimark

[57] ABSTRACT

The present invention provides a method and an apparatus for efficiently transporting living fishes and preserving the fishes for a long period of time, the living fishes are individually contained in small cases, and disposed at a low temperature. The cases for containing the living fishes are contained in a plurality of case containing vessels, and dipped in a transportation container or a preservation water tank. Thus, the living fishes can be transported and preserved in high density. Further, the movements of the fishes are suppressed at low temperature and the fishes can be preserved for a long period of time, and fish bodies are not damaged.

5 Claims, 10 Drawing Sheets

METHOD AND APPARATUS FOR TRANSPORTING AND PRESERVING LIVING FISHES

BACKGROUND OF THE INVENTION

The present invention relates to a method and an apparatus for transporting and preserving living fishes and, more particularly, to a method and an apparatus for transporting caught fishes and shellfishes as alive and preserving them in a cookshop or the like.

DESCRIPTION OF THE PRIOR ART

Heretofore, living fishes have been transported by a fishery truck by filling water in a water tank and supplying air into the tank. In a cookshop or the like, the living fishes are contained in a crawl or a water tank disposed at a shop front or the like and preserved while supplying air into the crawl or the tank.

According to the above-described conventional transporting method, the fishery truck of exclusive use must be prepared. Since no partition is provided in the crawl or the tank and living fishes freely sail or swim therein, the fishes contact with each other to cause the fish bodies to be feasibly damaged. Further, since the sailing space of predetermined degree for the fishes must be obtained, a number of fishes cannot be contained in high density in the tank, thereby deteriorating the transporting and preserving efficiencies. Moreover, some types of fishes cannot be contained together in one water tank. In this case, another water tank has to be prepared. In addition, since the water temperature of the tank rised during the transportation to become unpreferable state for the living fishes, ices are thrown in the tank so as to lower the water temperature. Thus, there arises a problem that the concentration of saline water is reduced to reduce the living rate of the fishes. Thus, the death rate of the living fishes during the transportation is enhanced. Furthermore, it is also difficult to manage the water temperature in view of the respective types of fishes.

SUMMARY OF THE INVENTION

Accordingly, an object of the present invention is to provide a method and an apparatus for transporting a number of living fishes in high density without damaging fish bodies and preserving the living fishes.

Another object of the present invention is to provide a method and an apparatus for transporting and preserving living fishes by preserving the fishes alive for a relatively long period of time.

Still another object of the present invention is to provide a method and an apparatus for transporting and preserving living fishes which can easily remove the fishes from a water tank or the like without possibly damaging fish bodies in this case.

Yet another object of the invention is to provide a method and an apparatus for transporting and preserving living fishes to supply fresh and tasty living fishes inexpensively.

Other and further objects, features and advantages of the invention will appear more fully from the following description.

DETAILED DESCRIPTION OF THE PREFERRED EMBODIMENTS

The most preferable embodiment of the present invention will be described in detail with reference to the accompanying drawings.

Figure 1:
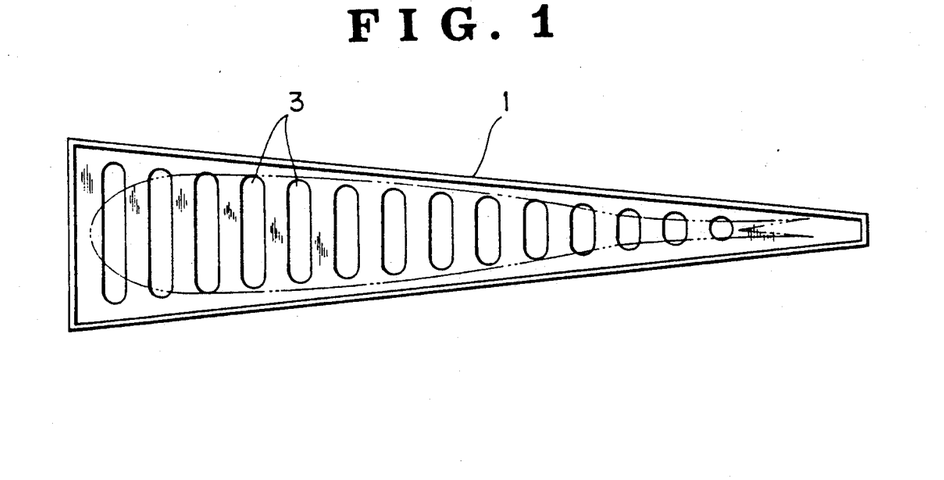
FIG. 1 is a plan view showing a configuration example of a case used in the present invention.
Figure 2:
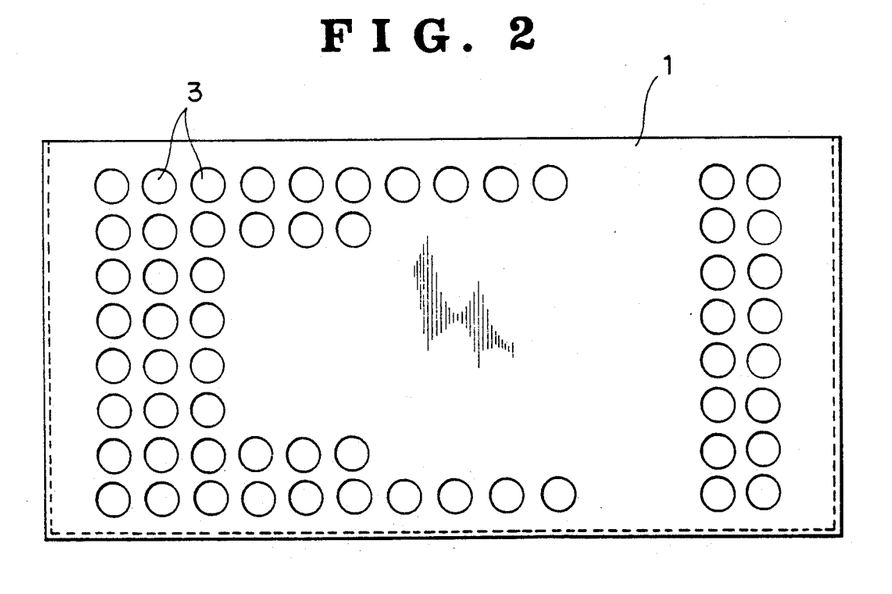
FIG. 2 is a front view of the case.
Figure 3:
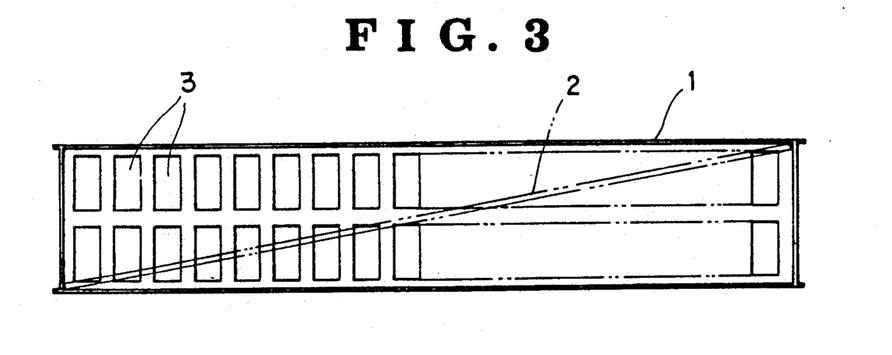
FIG. 3 is a plan view showing another configuration example of a case.

One or several fishes are contained in a transparent protection case 1 formed of acryl or the like in the present invention. The case 1 is formed in a shape similar to a fish shape, more preferably in a long triangular shape (in case of one fish in FIG. 1) or a rectangular shape (in case of containing several fishes in FIG. 3) in which a partition plate 2 is diagonally inserted. A number of flowing openings 3 for obtaining water flow are formed at least at the sides of the case 1. The peripheral edge of each flowing opening 3 is formed smoothly so as not to engage the scales of the fish. Or, the portion where the fish contacts, i.e., the side center of the case 1 may not be formed with the flowing opening 3 (FIG. 2). The upper surface of the case 1 may be or may not be provided. In case of no upper surface of the case 1, the fishes are introduced into or removed from above, which in case of the upper surface of the case 1, any side is pivotally secured with means, such as a hinge or hinges or the like to be openable. The case 1 is dipped directly or in the state that a plurality of cases 1 are contained in a case containing vessel 4 in a water tank or a crawl.

Figure 4:
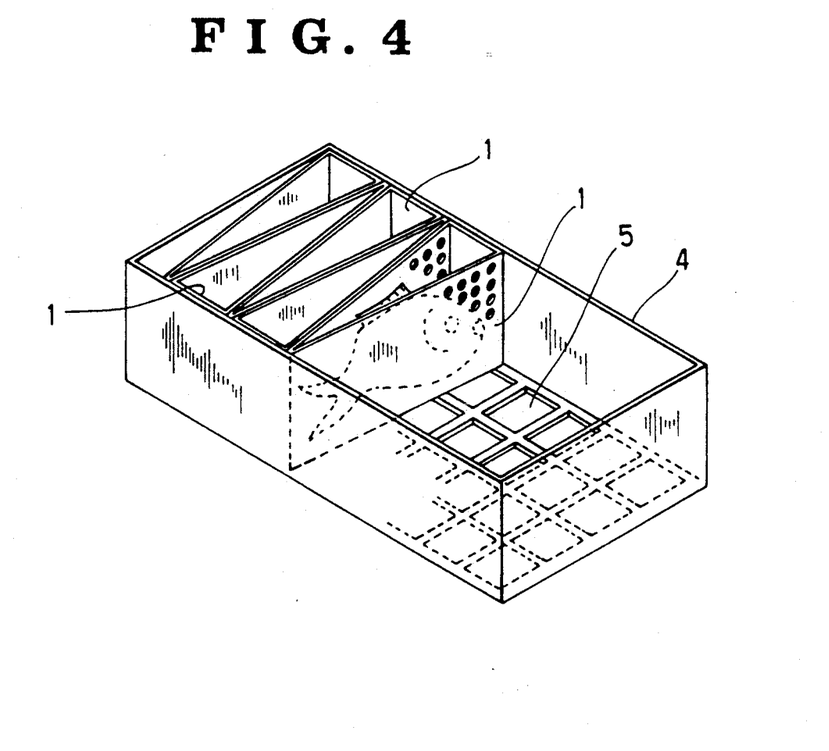
FIG. 4 is a perspective view showing a constitution example of a case containing vessel.
Figure 5:
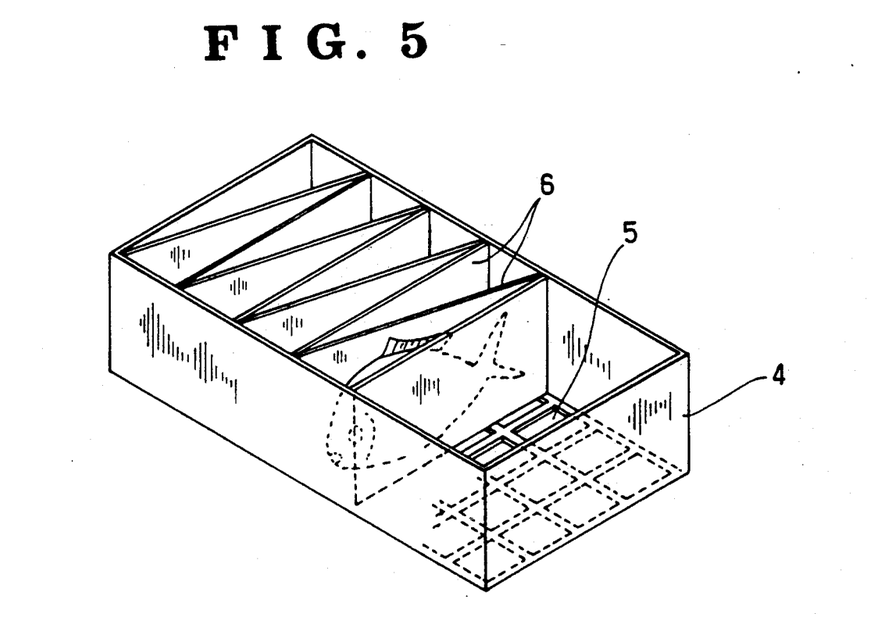
FIG. 5 is a perspective view showing another constitution example of a case containing vessel.

The case containing vessel 4 is formed of plastic, ordinarily formed in a box shape with an openable cover, and formed with flowing openings 5 for obtaining water flow at the respective sides or its cover and its bottom. A plurality of the cases 1 are aligned alternately in the opposite directions to be contained in the case containing vessel 4. A plurality of the case containing vessel 4 can be stacked. Further, without using the case 1, a plurality of partition plates 6 may be laterally and obliquely disposed in the case containing vessel 4 to form partition chambers, and fishes may be individually contained in the respective partition chambers (FIG. 5).

Figure 6:
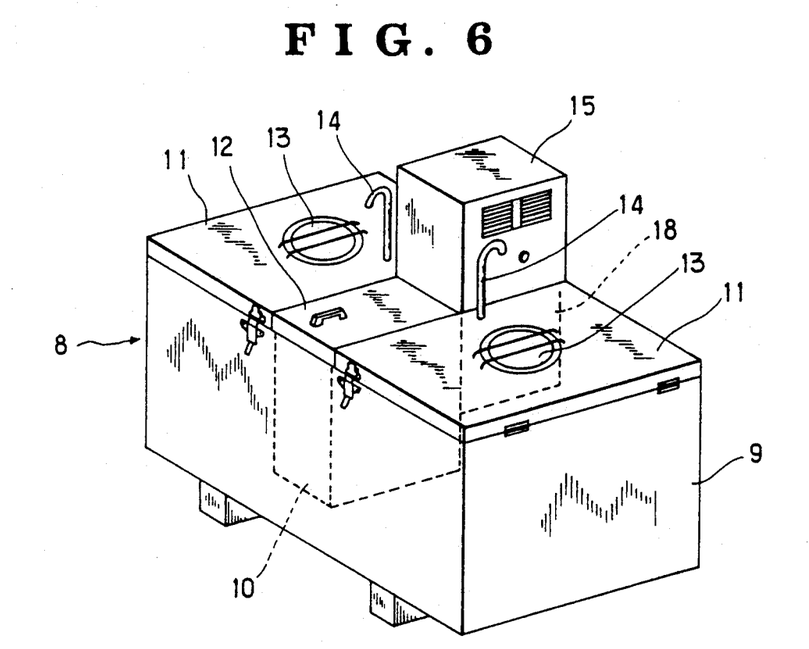
FIG. 6 is a perspective view showing a constitution example of a transportation container.
Figure 7:
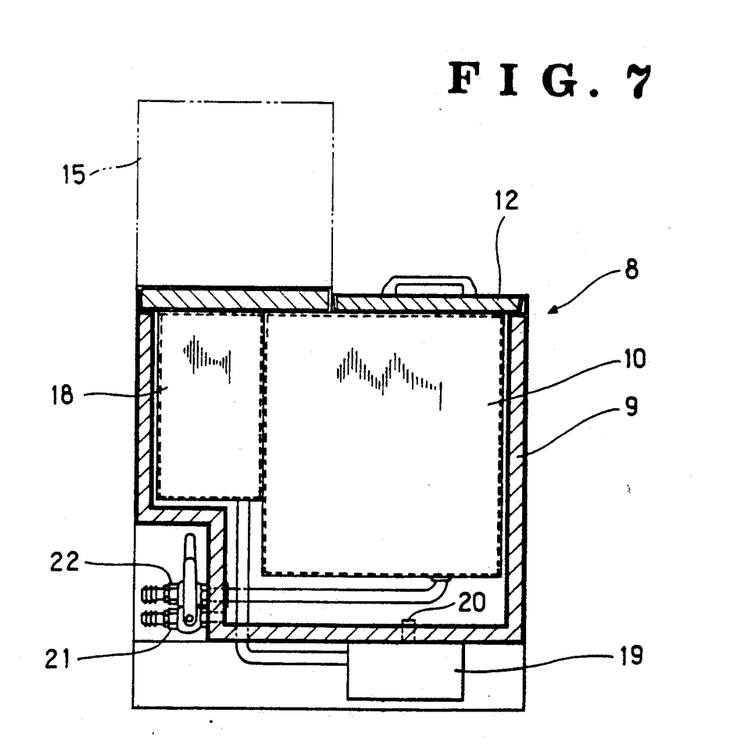
FIG. 7 is a longitudinal side sectional view showing the internal structure of the container.
Figure 8:
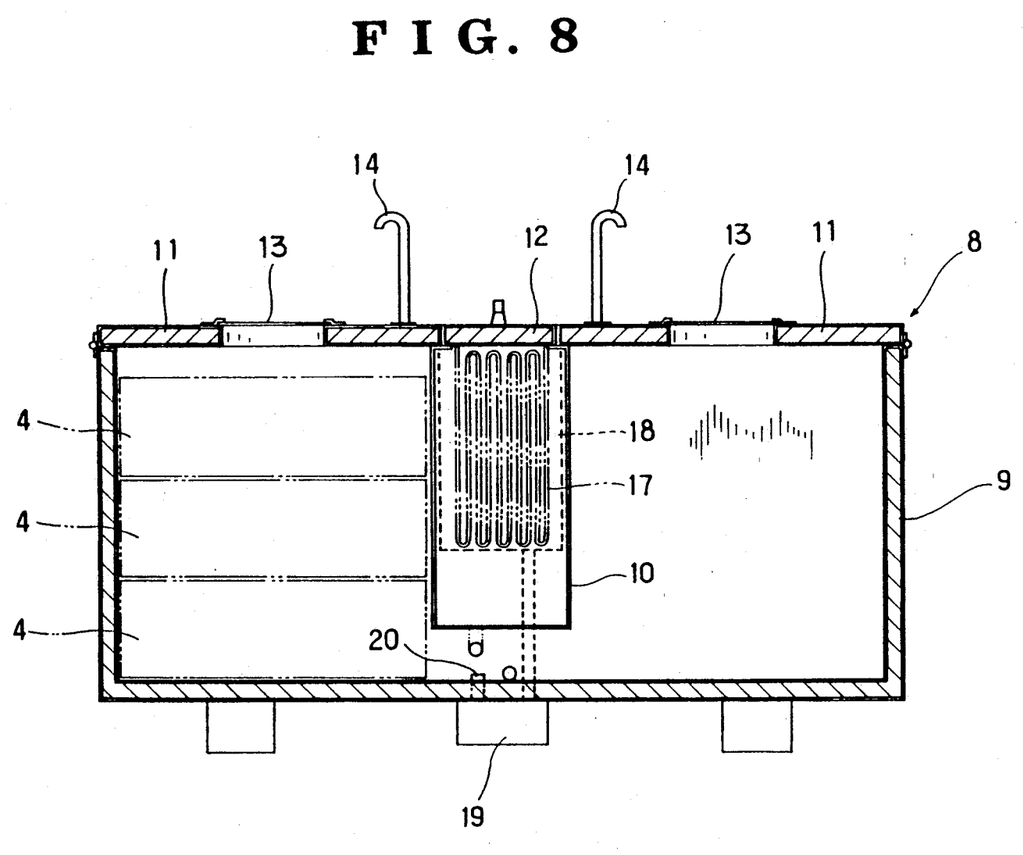
FIG. 8 is a longitudinal front sectional view of the structure.

FIGS. 6 to 8 show a constitution example of a transportation only container 8 for containing a plurality of case containing vessels 4. Reference numeral 9 denotes a water tank covered with a heat insulator, having a cooling chamber 10 disposed at the center thereof for splitting the water tank. The split two chambers and the cooling chamber 10 of the water tank 9 have watertight covers 11, 12 covered with heat insulators. The cover 11 is formed with an inspection window 13 for introducing a light thereinto and an internal inspection. Further, the cover 11 is mounted with an air vent 14. Ice or dry ice, cold storage material or the like is thrown in the cooling chamber 10 to continuously cool the water in the tank 9 during the transportation. Thus, the ices or the like are not directly contained in the water in the tank to avoid the dilution of sea or saline water, the contact of fish bodies with ices to damage the fish bodies to lose commodity value, and to preserve ices for a long period. The cooling chamber 10 shown in the drawings has a structure clamped in the water tank 9. However, it is noted that the cooling chamber 10 may be composed to be removable. A machine chamber 15 protruded on the water tank 9 contains two air pumps and two batteries for energizing the pumps. Air pipes 17 extended from the air pumps are laid in zigzag in the cooling chamber 10, and laid in the bottom of the water tank 9. In this manner, sufficiently cooled air is supplied into the water tank 9. Air is injected from many air openings of the air pipes laid on the bottom of the water tank 9. Numeral 18 denotes a purifier disposed at the rear of the cooling chamber 10 to suck and filter the water in the water tank 9 by a pump 19 mounted on the bottom of the water tank 9, and to return the water through a pipe 20 into the water tank 9. Numeral 21 denotes a cock for draining the water in the water tank 9, and numeral 22 denotes a cock for draining the water in the cooling chamber 10.

After a plurality of case containing vessels 4 are contained in the water tank 9 of the transporting container 8, they are transported. In this case, suitable amount of ices are contained in the cooling chamber 10, which is then covered with the cover 12, and the water in the water tank 9 is cooled to a predetermined degree for a short time. When the water temperature is already lowered to a predetermined temperature, the temperature is, of course, maintained. In the example shown by a solid line in a graph of FIG. 15, the water is lowered from ambient temperature by 4° C. to 20° C. for approx. 2 hours. This operation releases the stresses of the fishes so that the fishes are sunk and stood still. The following cooling is gradually performed due to the reduction in the ices (the temperature is reduced to 15° C. for 14 hours in the example in FIG. 15). The movements of the fishes are further reduced during this period so that the movements of the gills of the fishes are gradually weakened to approach the quasi-hibernation of the fishes. In the case of the transportation container 8 of the construction described above, a fishery truck is not required, but a general transportation truck 23 may be available, and the container may be loaded in mixture with other luggages. In the example shown by a broken line in the graph of FIG. 15, deliveries are conducted twice before the container is delivered to a retain shop or the like. In other words, the water is lowered to 19° C. to the first delivery time, an receipt seller further lowers the temperature to 17° C., and a second receipt seller further lowers it to 15° C. at the end of the transportation, and delivers the container to the retail shop.

In the transportation, a refrigerator truck may be used. In this case, a plurality of the cases 1 in which living fishes are contained are contained in the case containing vessel 4, stacked in a water tank not covered at peripheral surfaces with heat insulators, and then carried on the refrigerator truck.

Figure 9:
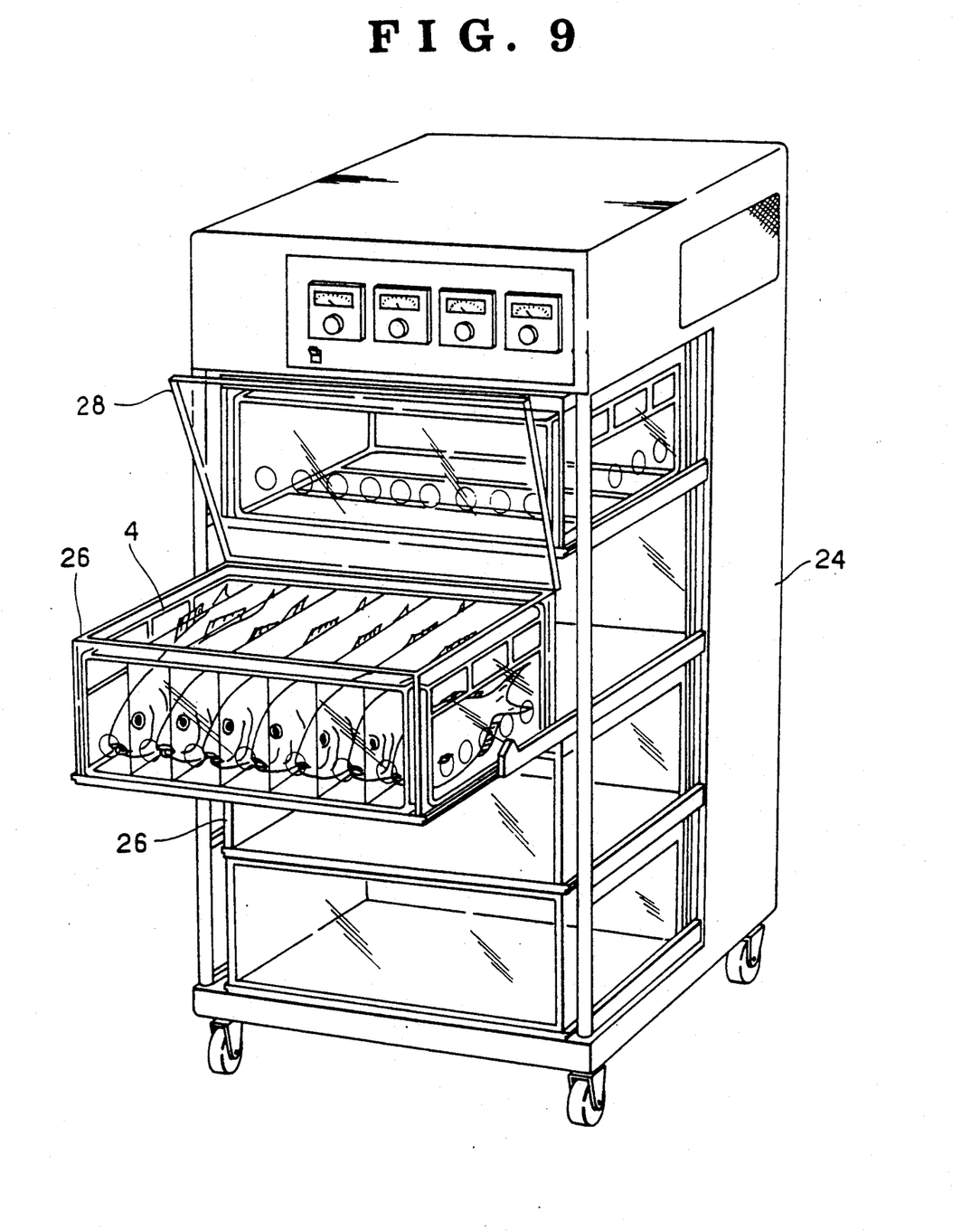
FIG. 9 is a perspective view showing a constitution example of a living fish preservation warehouse.
Figure 10:
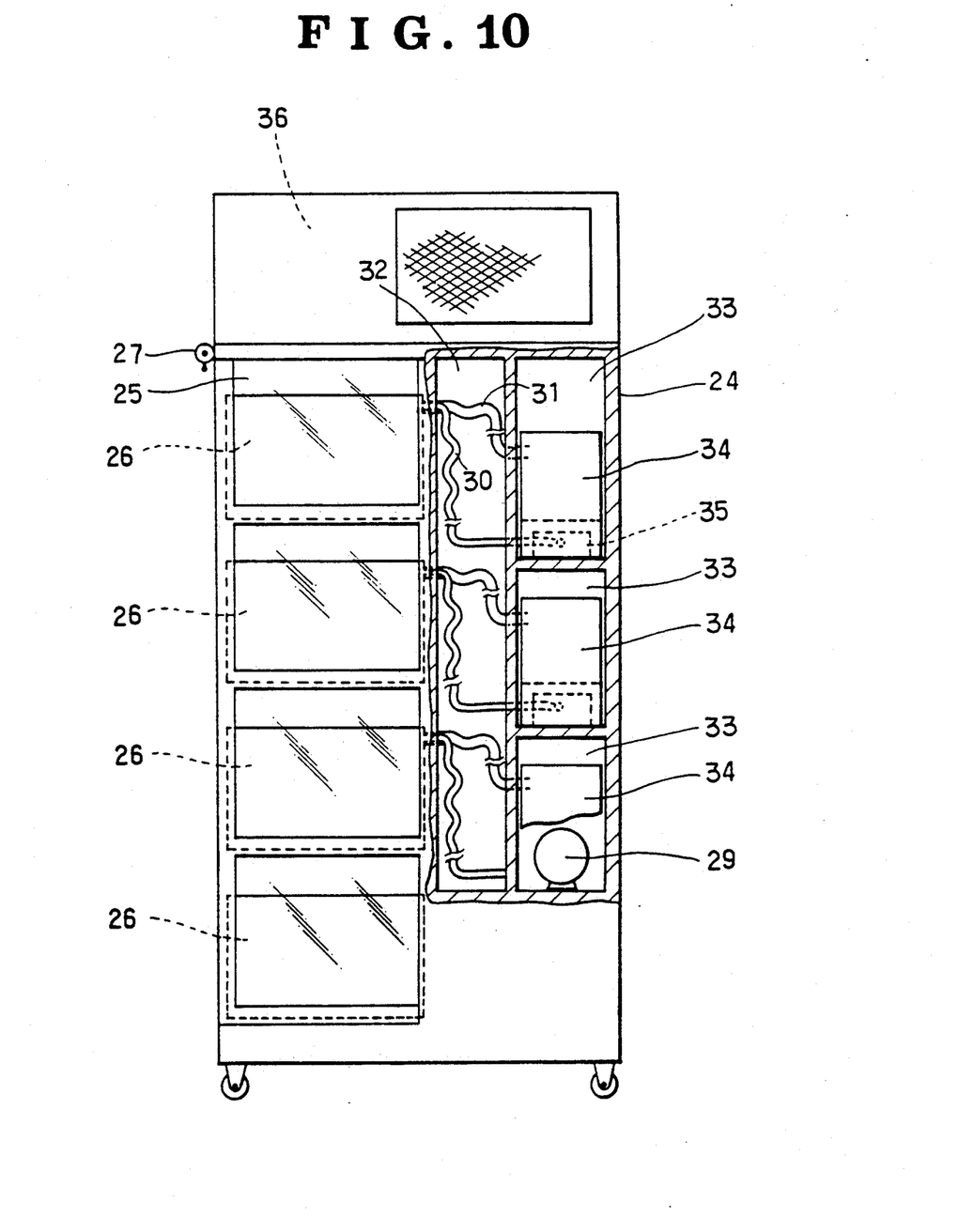
FIG. 10 is a partial side sectional view of the warehouse.

The living fishes delivered to the retail shop are transferred as the case containing vessel 4 to a living fish preservation warehouse 24 or a crawl. FIGS. 9 and 10 show a constitution example of a living fish preservation warehouse 24. The living fish preservation warehouse 24 has a preservation chamber 25 opened from the front to the side. The preservation chamber 25 is divided into three stages, in which drawable water tanks 26 are disposed in the respective stages. A wound curtain 27, a shutter and the like are provided for shielding both sides and the front of the preservation chamber 25 at night. The water tank 26 is formed ordinarily transparent with a cover 28 for preventing the living fishes from jumping from the water surface and scattering. A water inlet and a water outlet are formed at the rear or side (front in the drawing) of the water tank 26, and a drain opening is formed at the bottom. A flexible pipe 30 extended from a circulation pump 29 is engaged with the water inlet. A pipe 31 for dropping overflowed water into a filtering cooling tank 34 is engaged with the water outlet. The circulation pump 29 is mounted in one of partition chambers 33 formed in three stages through a partition chamber 32 at the rear of the preservation chamber 25. The pipes 30, 31 are slacked in the partition chamber 32, and extended upon drawing of the water tank 26. The circulation pump 29 is connected to the filtering cooling tank 34 in the partition chamber 33. The filtering cooling tank 24 has a basket filled with filtering sand, such as coral powder to be telescopically removed from above the filtering cooling tank 34. A cooler 35 is disposed under the basket. The water inlet of the cooling tank 34 is disposed on the basket, the outlet is disposed at the cooler 35, and connected to the circulation pump 29.

As described above, the water in the water tank 26 is fed from the water outlet of the water tank 26 through the pipe 31 and the water inlet to the filtering cooling tank 34. There, the water moved down while filtering is cooled by the cooler 35, delivered from the water outlet, and returned through the circulation pump 29, the pipe 30 and the water inlet into the water tank 26. The circulation of the water is continued always during the operation.

The cooler 35 is formed, for example, of an evaporator, a refrigerator body, such as a compressor and a condenser is mounted in the machine chamber 36 located on the preservation chamber 25, and refrigerant pipe extending therefrom is connected to the coolers 35. The coolers 35 are preferably composed to be individually managed at the respective temperatures. An air pump is further mounted in the machine chamber 36, and an air tube extended therefrom is connected to the water tanks 26 to always supply air into the water tanks 26.

Figure 15:
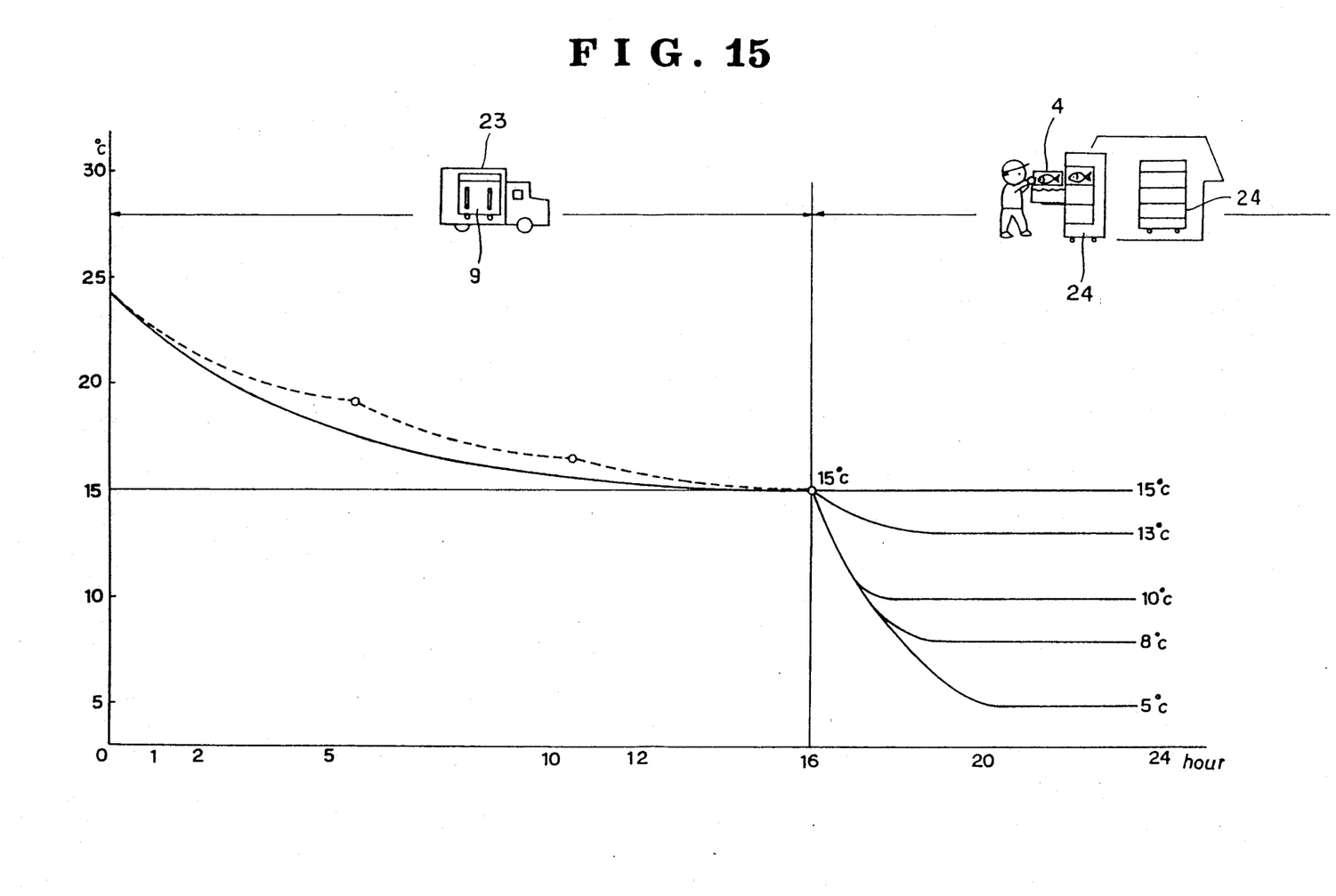
FIG. 15 is a view showing the transition of water temperature in flowing a process.

Living fishes individually contained in the cases 1 and contained in the case containing vessel 4 are contained in the case containing vessel 4 in the water tank 26 of the living fish preservation warehouse 24 as described above in the constitution example, cooled to a set temperature for a short time, and thereafter maintained at the temperature. In the example of FIG. 15, 5 types of setting temperatures are exemplified. When the water is eventually maintained at 15° C., the water temperature is maintained as it is. When the water temperature is lowered to 13° C., it is lowered to 13° C. in approx. 1 hour, while when it is lowered to 10° C., it is lowered to 10° C. in approx. 2 hours, and when it is lowered to 8° C., it is lowered to 8° C., it is lowered to 8° C. in approx. 3 hours. Further, when it is lowered to 5° C., it is lowered to 5° C. in approx. 4 hours. The living fishes are completely introduced into quasi-hibernation during the period to inspire through gills to maintain the freshness over a long period (one week or longer) and maintain the lives.

Then, the constitution example of a crawl used instead of the living fish preservation warehouse 24 will be described with reference to FIGS. 11 to 14.

Figure 11:
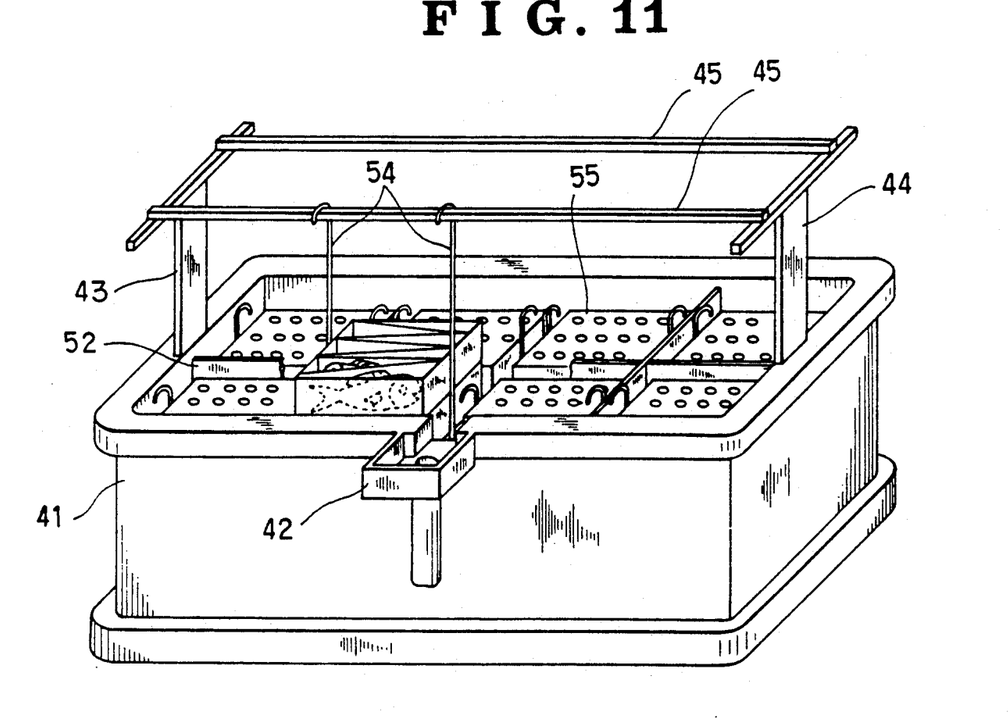
FIG. 11 is a view showing a constitution example of a crawl.
Figure 12:
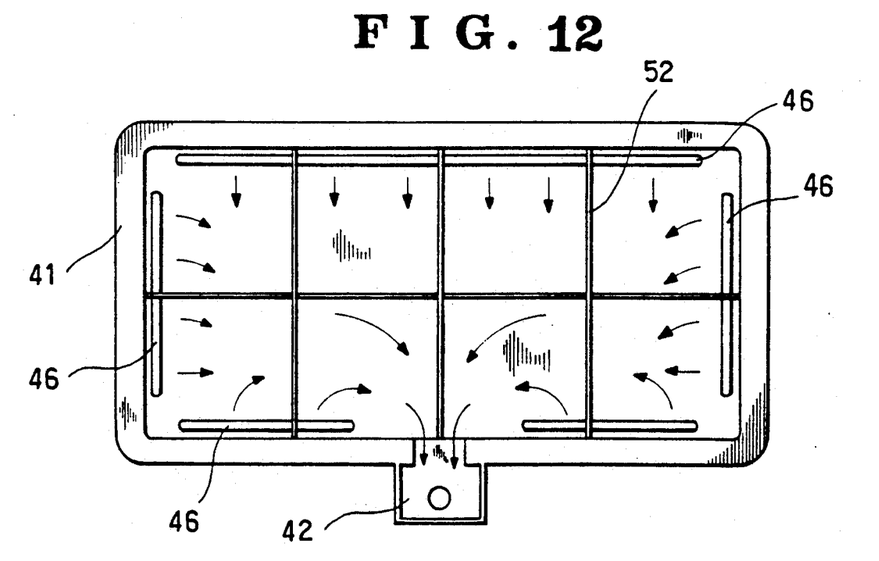
FIG. 12 is a plan view omitted at the top.

In the drawings, reference numeral 41 denotes a water tank of suitably size having a recovery port 42 for recovering contaminants or air bubbles floated on the surface of the water at the upper portion. Numerals 43 and 44 denote T-shaped posts stood at both sides of the water tank 41, and two connecting rods 45 are ordinarily bridged over between the posts 43 and 44. The posts 43, 44 and the connecting rod 45 may not be provided. Numeral 46 denotes an air pipe disposed on the periphery of the inner bottom of the water tank 41 formed with a number of pores for supplying air into the water.

Figure 13:
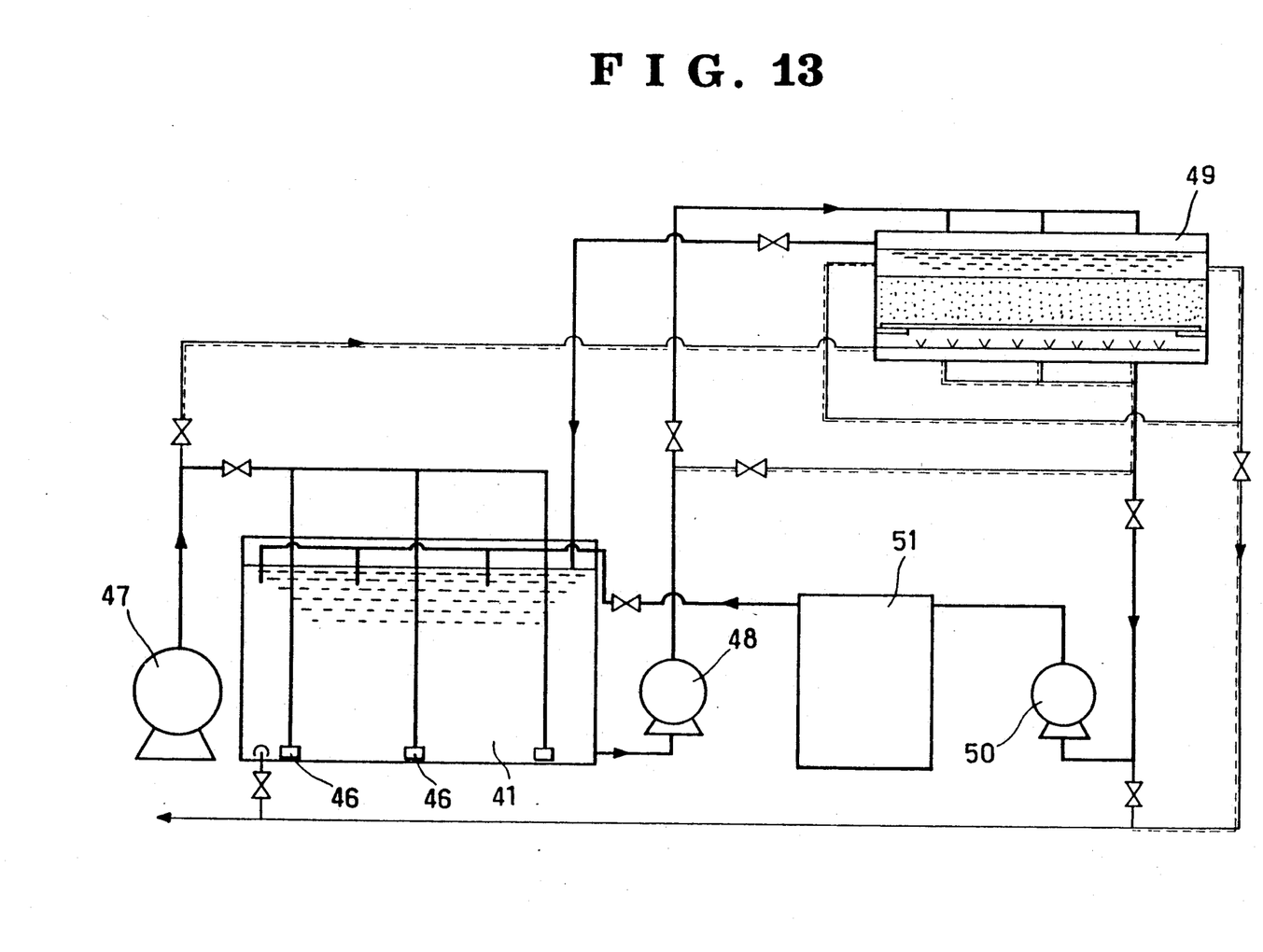
FIG. 13 is a system view of the crawl.

In FIG. 13, numeral 47 denote a blower connected to the air pipe 46. Numeral 48 denotes a suction pump for sucking to feed contaminated water in the water tank 41 into a filtering tank 49. Numeral 50 denotes a circulation pump for returning the water filtered in the filtering tank 49 into the water tank 41. Numeral 51 denotes a heating/cooling unit mounted in a water passage directed toward the water tank 41 to perform the function for regulating the temperature of the water supplied to the water tank 41. Thus, the water in the water tank 41 is always circulated and purified, regulated to the low temperature sufficient to suppress the movements of the fishes, and returned. Air is always supplied into the water tank 41 to maintain the state adapted for the living fishes in the water tank 41. A solid line in FIG. 13 indicates the water flow at the time of normal operation, and a broken line indicates the water flow at the time of purifying the filtering tank 49.

Figure 14:
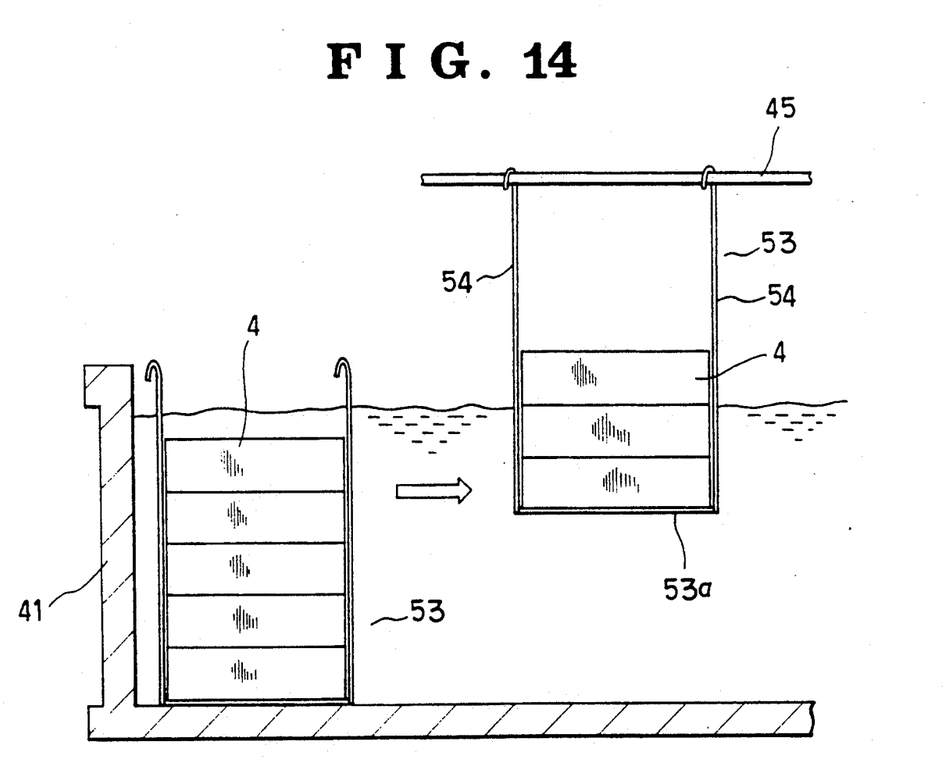
FIG. 14 is a view showing the hanging state of a lift.

Referring back to FIGS. 11 and 12, numeral 52 denotes a partition wall for partitioning the water tank 41 into several chambers (8 chambers in the exemplified example), formed with a number of flowing openings for obtaining water flows. The partition wall 42 functions to prevent the stacked case containing vessels 4 from laterally displacing. Numeral 53 denotes lifts inserted into the chambers partitioned by the partition walls 52 and formed of a bottom plate 53a, and arms 54, 54 hooked at the upper end extended from both sides of the bottom plate 53a upward. The hooks of the arms 54, 54 are engaged with the above-mentioned connecting rods 45. A plurality (5 in the example) of the case containing vessels 4 are stacked and placed on the bottom plate 53a of the lift 53 (FIG. 14).

In the constitution described above, a plurality (e.g., 8) of cases 1 in which living fishes are respectively contained are contained alternately in the directions in the case containing vessels 4. Similarly to the embodiment described above, this state can be weighed, or prepared for a trade. The case containing vessel 4 filled with the cases 1 is stacked on the bottom plate 53a of the lift 53 dipped in the water tank 41.

In the example shown, 5 stages are stacked, and 8 partition chambers of the water tank 41 are provided. Therefore, 40 case containing vessels 4 are contained totally in the water tank 41. Then, when 8 cases 1 are contained in the case containing vessel 4, 320 fishes can be contained in the water tank 41. In the case of the same size of water tank according to the conventional method, 50 fishes can be contained at the maximum, but according to the present invention, approx. 6 times as many as the fishes can be contained.

As described above, similarly to the case of the living fish preservation warehouse 24, the water in the water tank 41 is continuously circulated and filtered, the air is continuously supplied, the water temperature is so managed to a low temperature (e.g., 10° C.) as to suppress the movements of the fishes and maintain the lives of the fishes to hold the living fishes in the cases 1 alive for a long period of time.

Since the fishes are contained one by one in the respective cases 1, the fishes are not sailed about to be damaged or become lean, but the fish is tightened to be tasty. When the fishes are removed in case of cooking, the case containing vessel 4 is removed from the water tank 41, and desired fishes are removed as the case 1 from the case containing vessel 4. Then, the case 1 is inclined to remove the fish from the upper opening. When the case 1 is formed operably, the case 1 is opened to remove the fish. When the case containing vessel 4 is removed from the water tank 41, the upper two or three stages can be removed by inserting a hand into the water tank 41, but the other stages thereunder cannot arrive by the hand. In this case, the arms 54, 54 are grasped to raise the lift 53, the hooks of the arms 54, 54 are engaged with the connecting rod 45, and the lift 53 is disposed above (See FIG. 14). Thus, the hand can be arrived easily at the case containing vessel 4 of the lowermost layer. When the water tank 41 is shallow and the case containing vessel of the lowermost layer thus stacked can be sufficiently arrived by the hand, the lift 53 and the posts 43, 44 as well as the connecting rod 45 may be eliminated.

Since the air pipe 46 is disposed at the periphery of the inner bottom of the water tank 41, the air rises at the periphery to gather air bubbles and contaminants on the water surface to the center as designated by arrows in FIG. 12, and fed toward the recovery port 42, thereby providing high recovery efficiency. Since the aeration is not contacted directly with the fishes, the air is not introduced into the gills, or mouths of the fishes, thereby providing preferable environment for the living fishes.

What is claimed is:

1. A method of transporting and preserving living fishes comprising the steps of:

individually containing the living fishes in small separate one fish cases each having a number of flowing openings for containing one living fish, disposing the cases at low temperature that the living fishes can be alive and the movements of the fish can be suppressed, and wherein said separate one fish cases provide for handling of said fish without touching of the fish by a person.

2. A method of transporting and preserving living fishes according to claim 1, further comprising the steps of:

containing one living fish in a small case having a number of flowing openings, containing a number of the cases in a water tank to be transported and managed at the temperature thereof, enabling to maintain the water temperature while delivering, and controlling the water temperature.

3. An apparatus for transporting living fishes comprising:

a plurality of small separate one fish cases each having flowing openings for containing one living fish, a case containing vessel having flowing openings for containing a plurality of said cases regularly, a transportation container having an air supplying mechanism mounted in a bottom and a cooling chamber provided for containing a plurality of case containing vessels, and wherein said separate one fish cases provide for handling of said fish without touching of the fish by a person.

4. An apparatus for transporting living fishes comprising:

a plurality of small separate one fish cases each having flowing openings for containing one living fish, a case containing vessel having flowing openings for containing a plurality of said cases regularly, a living fish preservation warehouse, said warehouse having a filtering and cooling mechanism and an air supplying mechanism, and said warehouse containing a plurality of stages of water tanks and, containing a plurality of case containing vessels, and wherein said separate one fish cases provide for handling of said fish without touching of the fish by a person.

5. An apparatus for transporting living fishes comprising:

a plurality of small separate one fish cases each having flowing openings for containing one living fish, a case containing vessel having flowing openings for containing a plurality of said cases regularly, a living fish preservation warehouse, said warehouse having a filtering and cooling mechanism and an air supplying mechanism, said warehouse containing a crawl for containing a plurality of case containing vessels, and wherein said separate one fish cases provide for handling of said fish without touching of the fish by a person.

* * * * *